(12) United States Patent
Shiraishi

(10) Patent No.: US 9,948,840 B2
(45) Date of Patent: Apr. 17, 2018

(54) OPTICAL DRIVING APPARATUS, LENS APPARATUS, AND IMAGE PICKUP APPARATUS

(71) Applicant: CANON KABUSHIKI KAISHA, Tokyo (JP)

(72) Inventor: Daisuke Shiraishi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/368,934

(22) Filed: Dec. 5, 2016

(65) Prior Publication Data

US 2017/0163858 A1    Jun. 8, 2017

(30) Foreign Application Priority Data

Dec. 8, 2015    (JP) ................. 2015-239406

(51) Int. Cl.
*H04N 5/225*    (2006.01)
*G02B 7/10*    (2006.01)
*G02B 7/14*    (2006.01)
*H04N 5/232*    (2006.01)

(52) U.S. Cl.
CPC ............. *H04N 5/2254* (2013.01); *G02B 7/10* (2013.01); *G02B 7/14* (2013.01); *H04N 5/23296* (2013.01)

(58) Field of Classification Search
CPC .. G03B 17/14; H04N 5/23209; H04N 5/2254; H04N 5/23296; G02B 7/04; G02B 7/14; G02B 7/10
See application file for complete search history.

(56) References Cited

U.S. PATENT DOCUMENTS 4,404,595 A * 9/1983 Ushiro ................ G03B 3/10
348/348
2013/0077952 A1* 3/2013 Sugiyama ............ G03B 17/56
396/530

FOREIGN PATENT DOCUMENTS

JP    2007104316 A    4/2007
JP    2007108373 A    4/2007

* cited by examiner

*Primary Examiner* — Twyler Haskins
*Assistant Examiner* — Angel L Garces-Rivera
(74) *Attorney, Agent, or Firm* — Rossi, Kimms & McDowell LLP

(57) ABSTRACT

An optical driving apparatus (401) is removably attached to a lens apparatus (201), and includes an attachment portion (403) that is attachable to the lens apparatus, a driver (404, 405) that electrically drives an operation member (204) that manually moves an optical system of the lens apparatus in an optical axis direction, and a controller (402) that controls the driver based on an instruction via an input portion (408), and the controller allows an operation of the driver when the optical driving apparatus is attached to the lens apparatus, and limits the operation of the driver when the optical driving apparatus is not attached to the lens apparatus.

12 Claims, 7 Drawing Sheets

OPTICAL DRIVING APPARATUS, LENS APPARATUS, AND IMAGE PICKUP APPARATUS

BACKGROUND OF THE INVENTION

Field of the Invention

The present invention relates to a lens driving adapter which is removably attached to a lens apparatus and is capable of driving an operation member of the lens apparatus.

Description of the Related Art

Japanese Patent Laid-open No. 2007-108373 discloses a power zoom apparatus (lens driving adapter) that is capable of performing a power zoom operation by being attached to a lens unit (lens apparatus) to drive a zoom ring (operation member) of the lens unit. Power required for operating the power zoom apparatus is supplied from a power source of a camera body via the lens unit.

The camera body and the lens unit need power to drive respective elements inside them. Therefore, the power which can be supplied from the power source of the camera body to the lens driving adapter is limited. In order to achieve zoom drive at higher speed and with higher torque, more power is needed, and accordingly it is considered to adopt a configuration where a power source is independently provided in the lens driving adapter. In this case, the lens driving adapter includes the power source and a driving member (rotating body), and accordingly the lens driving adapter can independently rotate the driving member even when the lens driving adapter is not attached to a lens barrel.

However, in the power zoom apparatus disclosed in Japanese Patent Laid-open No. 2007-108373, a part of the rotating body is exposed at an opening of an outer case. Therefore, there is a space between the opening of the outer case and the rotating body. Accordingly, if the power zoom apparatus is provided with the power source to be able to independently drive the rotating body, there is a possibility that fingers, nails, hairs and the like are accidentally caught in the space between the rotating body during rotation and the opening of the outer case.

SUMMARY OF THE INVENTION

The present invention provides an optical driving apparatus, a lens apparatus, and an image pickup apparatus with high safety.

An optical driving apparatus as one aspect of the present invention is removably attached to a lens apparatus, and includes an attachment portion attachable to the lens apparatus, a driver configured to electrically drive an operation member, the operation member being configured to manually move an optical system of the lens apparatus in an optical axis direction, and a controller configured to control the driver based on an instruction via an input portion, and the controller is configured to allow an operation of the driver when the optical driving apparatus is attached to the lens apparatus, and limit the operation of the driver when the optical driving apparatus is not attached to the lens apparatus.

A lens apparatus as another aspect of the present invention includes an optical system and the optical driving apparatus.

An image pickup apparatus as another aspect of the present invention includes the lens apparatus and an image sensor configure to perform photoelectric conversion of an optical image formed via the optical system to output image data.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
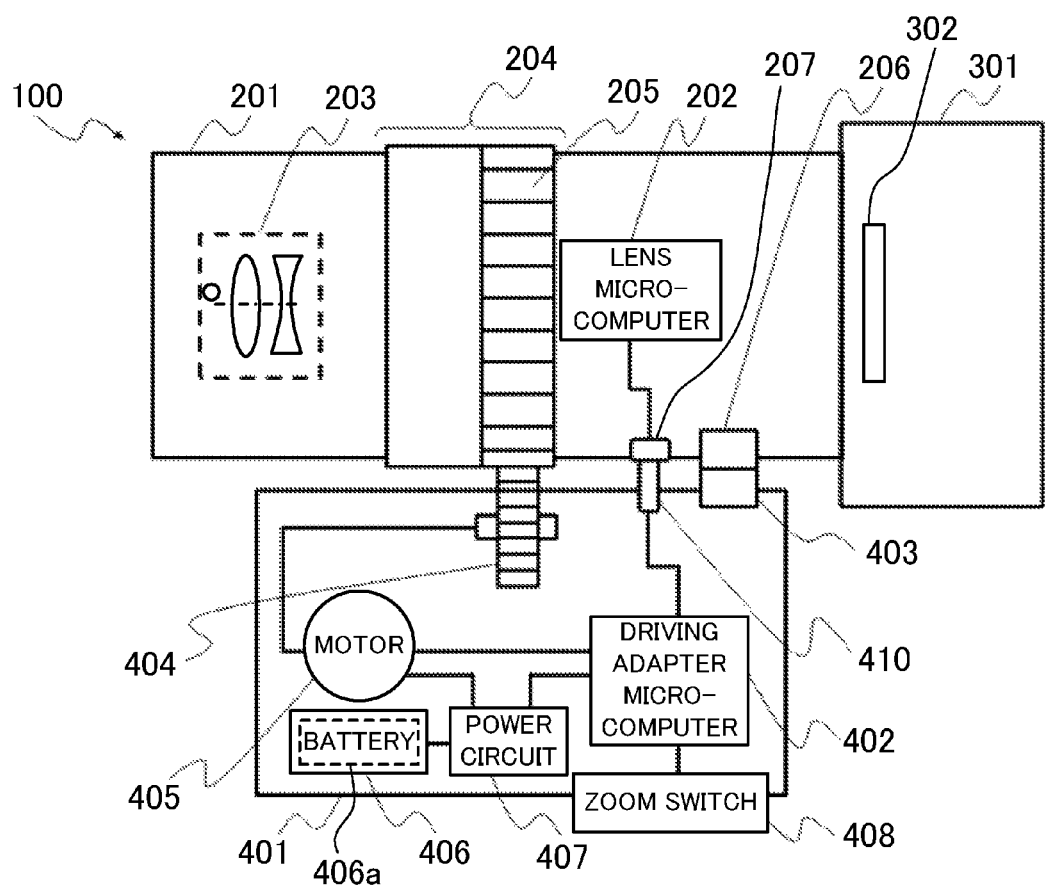
FIG. 1 is a block diagram of illustrating an entire configuration of a camera system in Embodiment 1.
Figure 2:
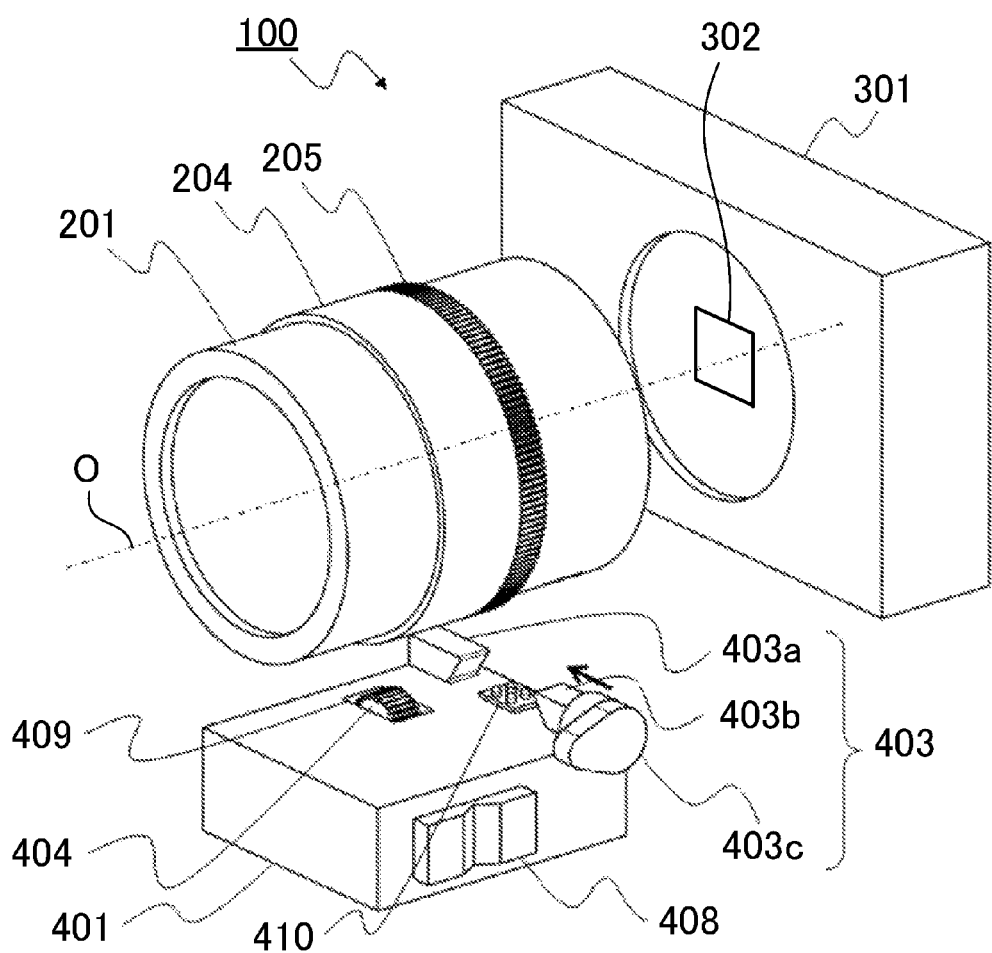
FIG. 2 is an external perspective view of the camera system in Embodiment 1.

First of all, referring to FIGS. 1 and 2, a lens driving adapter (optical driving apparatus) in Embodiment 1 of the present invention will be described. FIG. 1 is a block diagram of illustrating an entire configuration of a camera system 100 in this embodiment. FIG. 2 is an external perspective view of the camera system 100. As illustrated in FIGS. 1 and 2, the camera system 100 (image pickup apparatus) includes an interchangeable lens 201 (lens apparatus), a camera body 301 (image pickup apparatus body), and a lens driving adapter 401.

The interchangeable lens 201 is removably attached to the camera body 301 by a known bayonet mount structure (not illustrated). The camera body 301 includes an image sensor 302. The image sensor 302 photoelectrically converts an optical image formed via the interchangeable lens 201 (optical system) to output image data. The lens driving adapter 401 is removably attached to an attachment portion 206 of the interchangeable lens 201 via an attachment portion 403 (mounting portion). In other words, the attachment portion 403 of the lens driving adapter 401 can be attached to the interchangeable lens 201. The attachment portion 403 includes a fixed claw 403a (engagement portion), a movable claw 403b (engagement portion), and an attachment lever 403c. The attachment portion 206 is provided with a concave-shaped fixed claw insertion portion (not illustrated) where the fixed claw 403a is supposed to engage and a concave-shaped movable claw insertion portion (not illustrated) where the movable claw 403b engages. When the attachment lever 403c is manually rotated while the fixed claw 403a engages with the fixed claw insertion portion, the movable claw 403b slides in a direction (arrow direction illustrated in FIG. 2) towards the fixed claw 403a by a cam mechanism (not illustrated) so that the movable claw 403b engages with the movable claw insertion portion of the attachment portion 206. Thus, the lens driving adapter 401 is fixed to the interchangeable lens 201.

The interchangeable lens 201 and the lens driving adapter 401 include a lens communication portion 207 and a driving adapter communication portion 410 that perform mutual electric communication when the lens driving adapter 401 is attached to the interchangeable lens 201, respectively. The interchangeable lens 201 and the lens driving adapter 401 transfers, via the lens communication portion 207 and the driving adapter communication portion 410, various pieces of information such as respective operation states and setting states, request commands of (requests for sending) various pieces of information, and drive commands.

The interchangeable lens 201 includes a lens microcomputer 202 (controller) that controls each element (each portion) in the interchangeable lens 201. The interchangeable lens 201 includes a zoom lens unit 203 as an optical system (optical element), and the zoom lens unit 203 is connected to a manual operation portion 204 (operation member) via a known cam mechanism (not illustrated). The manual operation portion 204 is used to manually move the zoom lens unit 203 (optical system) of the interchangeable lens 201 in a direction along an optical axis O (optical axis direction). In other words, the zoom lens unit 203 can move forward and backward in the direction along the optical axis O by rotating the manual operation portion 204 manually, and thus a focal length of the interchangeable lens 201 can be changed. The manual operation portion 204 is provided with a driven gear 205 that is formed integrally with the manual operation portion 204. The driven gear 205 is configured to engage with a driving gear 404 of the lens driving adapter 401 described below when the lens driving adapter 401 is attached to the interchangeable lens 201. While the interchangeable lens 201 includes other various elements such as a focus lens unit that performs focusing and an aperture stop mechanism that performs light amount adjustment, they are omitted for simplifying descriptions.

The lens driving adapter 401 includes a driving adapter microcomputer 402 (controller) that controls each element (each portion) in the lens driving adapter 401 and a motor 405 (driver). The lens driving adapter 401 includes a storage portion 406 (storage space) that stores a battery 406a (battery portion or power source). The battery 406a supplies power to the driving adapter microcomputer 402 and the motor 405. As described above, the lens driving adapter 401 supplies, to a power circuit 407, the power supplied from the power source (battery 406a) that is independent of each of the camera body 301 and the interchangeable lens 201. The power circuit 407 converts the power supplied from the battery 406a into a voltage to be supplied to each portion of the lens driving adapter 401 such as the driving adapter microcomputer 402 and the motor 405. The lens driving adapter 401 including the independent power source (battery) as described in this embodiment can intrinsically rotate the driving gear 404 even in a state where the lens driving adapter 401 is not attached to the interchangeable lens 201. Accordingly, the lens driving adapter 401 needs to control the motor 405 depending on whether or not it is attached to the interchangeable lens 201.

The lens driving adapter 401 includes a zoom switch 408 (input portion). The zoom switch 408 is a switch to output a zoom control signal (i.e., instruction signal for moving the zoom lens unit 203 to a wide-angle side or a telephoto side in the direction along the optical axis O) according to an operation by a user. The zoom control signal output according to the operation of the zoom switch 408 is converted into a digital signal, and then it is input to the driving adapter microcomputer 402. The driving adapter microcomputer 402 controls the motor 405 (driver) according to the input zoom control signal (based on the instruction from the zoom switch 408). Thus, by attaching the lens driving adapter 401 to the interchangeable lens 201, it is possible to achieve a power zoom operation of the zoom lens unit 203 according to the operation of the zoom switch 408. While the zoom switch 408 is provided on the body of the lens driving adapter 401, this embodiment is not limited thereto, and instead a remote-control zoom switch as a remote controller may be used.

The motor 405 is connected to the driving gear 404 (driving member) via a plurality of gears (not illustrated). In this embodiment, the driving gear 404 and the motor 405 constitute the driver that electrically drives the manual operation portion 204 (operation member). At least a part of the driving gear 404 is exposed at an opening 409 of the lens driving adapter 401. Therefore, when the lens driving adapter 401 is attached to the interchangeable lens 201, the driving gear 404 of the lens driving adapter 401 and the driven gear 205 formed on the manual operation portion 204 of the interchangeable lens 201 engage with each other.

Figure 3:
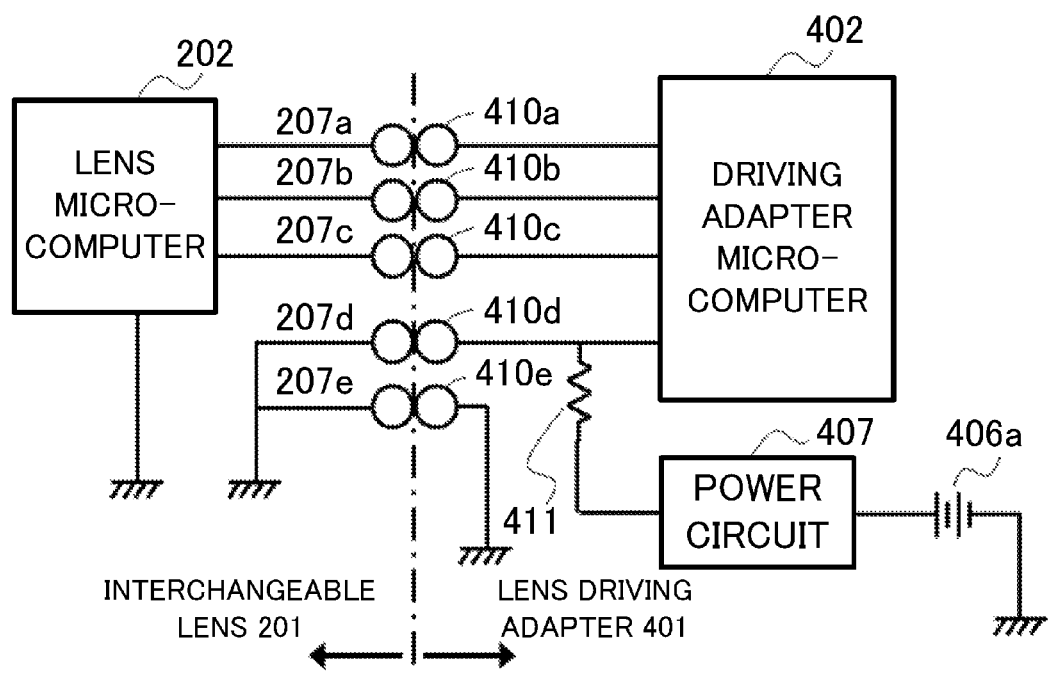
FIG. 3 is a block diagram of illustrating a main part of a lens driving adapter and an interchangeable lens in Embodiment 1.

Next, referring to FIG. 3, a method of detecting an attachment state of the lens driving adapter 401 to the interchangeable lens 201 will be described. FIG. 3 is a block diagram of illustrating main portions of the lens driving adapter 401 and the interchangeable lens 201 in this embodiment.

The lens communication portion 207 includes lens communication terminals 207a, 207b, and 207c. The driving adapter communication portion 410 includes driving adapter communication terminals 410a, 410b, and 410c. When the lens driving adapter 401 is attached to the interchangeable lens 201, respective terminals are connected to perform communication (serial communication) between the lens microcomputer 202 and the driving adapter microcomputer 402. The lens communication portion 207 further includes an attachment detection terminal 207d and a ground terminal 207e. The driving adapter communication portion 410 further includes an attachment detection terminal 410d as a detection portion and a ground terminal 410e. When the lens driving adapter 401 is attached to the interchangeable lens 201, the attachment detection terminal 410d and the ground terminal 410e are connected to the attachment detection terminal 207d and the ground terminal 207e, respectively. As a result, a potential (voltage) of the attachment detection terminal 410d is lowered to a ground level (LOW level). The driving adapter microcomputer 402 detects the attachment of the lens driving adapter 401 to the interchangeable lens 201 when the level of the attachment detection terminal 410d is changed to the LOW level.

On the other hand, when the lens driving adapter 401 is not attached to (i.e., is removed from) the interchangeable lens 201, the attachment detection terminal 410d is pulled up by a pull-up resistor 411. Accordingly, the potential (voltage) of the attachment detection terminal 410d is equal to a voltage level (HIGH level) supplied from the power circuit 407. The driving adapter microcomputer 402 detects that the lens driving adapter 401 is not attached to the interchangeable lens 201 when the attachment detection terminal 410d is at the HIGH level.

Next, referring to FIG. 4, processing that is performed depending on the attachment state of the lens driving adapter 401 to the interchangeable lens 201 will be described. FIG.

4 is a flowchart of illustrating the processing that is performed depending on the attachment state of the lens driving adapter 401.

First, at step S1, a user inserts the battery 406a (power source) into the lens driving adapter 401 (power on). Then, at step S2, supplying the power (voltage) to the driving adapter microcomputer 402 starts. In this case, the power of the battery 406a is converted into the voltage by the power circuit 407 to be supplied to the driving adapter microcomputer 402.

Subsequently, at step S3, the driving adapter microcomputer 402 determines whether or not the attachment detection terminal 410d is at the LOW level. When the attachment detection terminal 410d is at the LOW level, the flow proceeds to step S4. At step S4, the driving adapter microcomputer 402 determines that the lens driving adapter 401 is attached to the interchangeable lens 201, and it allows the drive of the motor 405. As described above, when the user operates the zoom switch 408, the driving adapter microcomputer 402 drives the motor 405 depending on an operation amount of the zoom switch 408 to rotate the driving gear 404.

On the other hand, when the attachment detection terminal 410d is not at the LOW level (i.e., the attachment detection terminal 410d is at the HIGH level), the flow proceeds to step S5. At step S5, the driving adapter microcomputer 402 determines that the lens driving adapter 401 is not attached to the interchangeable lens 201, and it prohibits (suppresses or limits) the drive of the motor 405. Then, at step S6, the driving adapter microcomputer 402 outputs, to a display unit (not illustrated) of the lens driving adapter 401, a display to notify the user that the lens driving adapter 401 is not attached to the interchangeable lens 201. Then, the flow returns to step S3. In this embodiment, the voltage of the attachment detection terminal 410d only needs to change depending on whether or not the lens driving adapter 401 is attached to the interchangeable lens 201, and accordingly the HIGH level and the LOW level may be opposite to each other.

As described above, in this embodiment, the communication portion (driving adapter communication portion 410) includes the attachment detection terminal 410d (and the ground terminal 410e) in addition to the communication terminals (driving adapter communication terminals 410a to 410c) which perform the communication with the interchangeable lens 201. The controller (driving adapter microcomputer 402) determines whether or not the lens driving adapter 401 is attached to the interchangeable lens 201 based on the voltage (voltage level) of the attachment detection terminal 410d of the communication portion. When the lens driving adapter 401 is not attached to the interchangeable lens 201, the driving adapter microcomputer 402 controls the driving gear 404 exposed at the opening 409 of the lens driving adapter 401 so as not to rotate. As a result, fingers, nails, hairs and the like are not caught in a space between the opening 409 and the driving gear 404, and accordingly the high-safety lens driving adapter can be provided.

Embodiment 2

Figure 5:
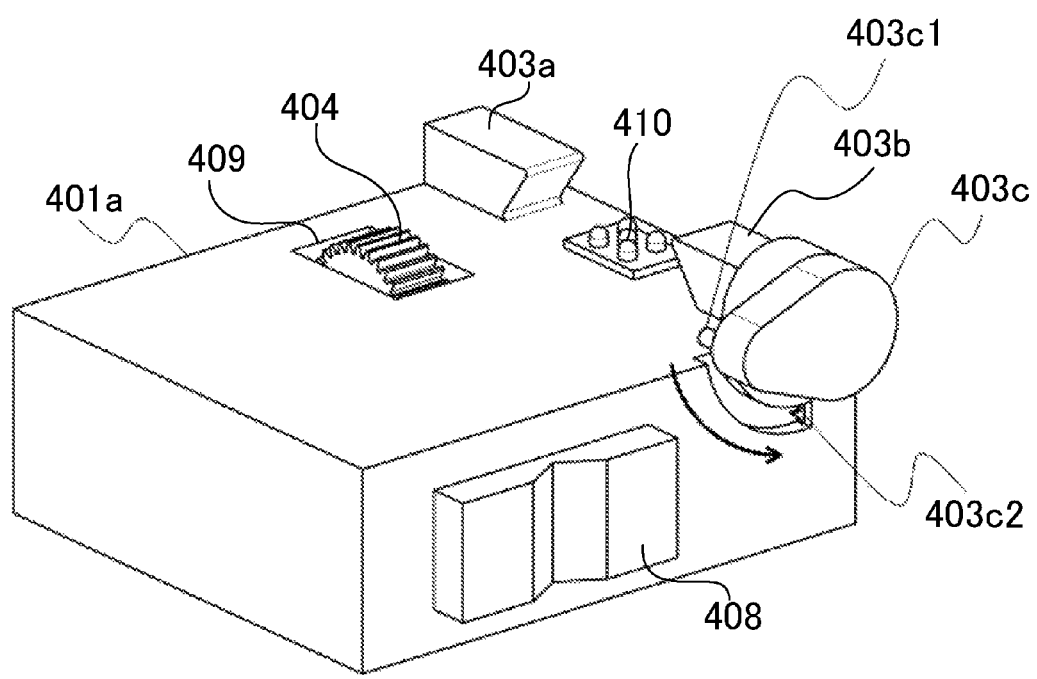
FIG. 5 is an external perspective view of a lens driving adapter in Embodiment 2.

Next, referring to FIG. 5, a lens driving adapter in Embodiment 2 of the present invention will be described. FIG. 5 is an external perspective view of a lens driving adapter 401a in this embodiment. The lens driving adapter 401a of this embodiment is different from the lens driving adapter 401 of Embodiment 1 in that the lens driving adapter 401a includes a pin 403c1 and a detection switch 403c2.

Other configurations of the lens driving adapter 401a are the same as those of the lens driving adapter 401 in Embodiment 1, and accordingly descriptions thereof are omitted.

In this embodiment, the pin 403c1 is integrally formed at an end of an attachment lever 403c of the lens driving adapter 401a. The detection switch 403c2 (detector) is a typical binary switch, and it sends, to the driving adapter microcomputer 402, a signal indicating whether the detection switch 403c2 is pressed (ON state) or it is not pressed (OFF state). When the attachment lever 403c is rotated in an arrow direction illustrated in FIG. 5, i.e., in a direction where the lens driving adapter 401 is to be removed from the interchangeable lens 201, the detection switch 403c2 is pressed by the pin 403c1 to be in the ON state. Conversely, when the attachment lever 403c is rotated in a direction opposite to the arrow direction illustrated in FIG. 5, i.e., in a direction where the lens driving adapter 401 is to be attached to the interchangeable lens 201, the pin 403c1 is removed from the detection switch 403c2 to be in the OFF state.

When the detection switch 403c2 is in the ON state, the driving adapter microcomputer 402 determines that the lens driving adapter 401a is not attached to the interchangeable lens 201 and it prohibits (suppresses or limits) the drive of the motor 405. On the other hand, when the switch 403c2 is in the OFF state, the driving adapter microcomputer 402 determines that the lens driving adapter 401a is attached to the interchangeable lens 201 and it allows the drive of the motor 405. While a contact switch is used as the detection switch 403c2, this embodiment is not limited thereto, and instead a noncontact switch such as a photo-interrupter may be used. In this embodiment, the state of the detection switch 403c2 only needs to change depending on whether or not the lens driving adapter 401a is attached to the interchangeable lens 201, and accordingly the ON state and the OFF state may be opposite to each other.

In this embodiment, the attachment portion 403 includes the engagement portion (movable claw 403b) that is engageable with the interchangeable lens 201 and the operation portion that is capable of moving the engagement portion to engage with the interchangeable lens 201. Preferably, the operation portion is a rotating operation portion (attachment lever 403c) that is rotatable to move the engagement portion to engage with the interchangeable lens 201. The controller (driving adapter microcomputer 402) determines, based on a rotation position of the attachment lever 403c, whether or not the lens driving adapter 401a is attached to the interchangeable lens 201. More preferably, the attachment portion 403 includes a protrusion (pin 403c1) that is provided on the attachment lever 403c and a switch (detection switch 403c2) that is to be pressed by the pin 403c1 depending on the rotation position of the attachment lever 403c. When the detection switch 403c2 is pressed by the pin 403c1, the controller determines that the lens driving adapter 401a is attached to the interchangeable lens 201.

As described above, the driving adapter microcomputer 402 of this embodiment determines whether or not the lens driving adapter 401a is attached to the interchangeable lens 201 based on the state of the detection switch 403c2 provided on the attachment portion 403. When the lens driving adapter 401a is not attached to the interchangeable lens 201, the driving adapter microcomputer 402 controls the driving gear 404 exposed at the opening 409 of the lens driving adapter 401a so as not to rotate. As a result, fingers, nails, hairs and the like are not caught in a space between the opening 409 and the driving gear 404, and accordingly the high-safety lens driving adapter can be provided.

Embodiment 3

Next, referring to FIGS. 6 and 7, a lens driving adapter in Embodiment 3 of the present invention will be described. This embodiment is different from each of Embodiments 1 and 2 in that the driving adapter microcomputer 402 of this embodiment determines whether or not a lens driving adapter 401b is attached to the interchangeable lens 201 based on both of the voltage level of the attachment detection terminal 410d and the state of the detection switch 403c2. In other words, the lens driving adapter 401b of this embodiment corresponds to a combination of the features of the lens driving adapter 401 of Embodiment 1 and the lens driving adapter 401a of Embodiment 2. Other configurations of this embodiment are the same as those of each of Embodiments 1 and 2, and accordingly descriptions thereof are omitted.

Figure 6:
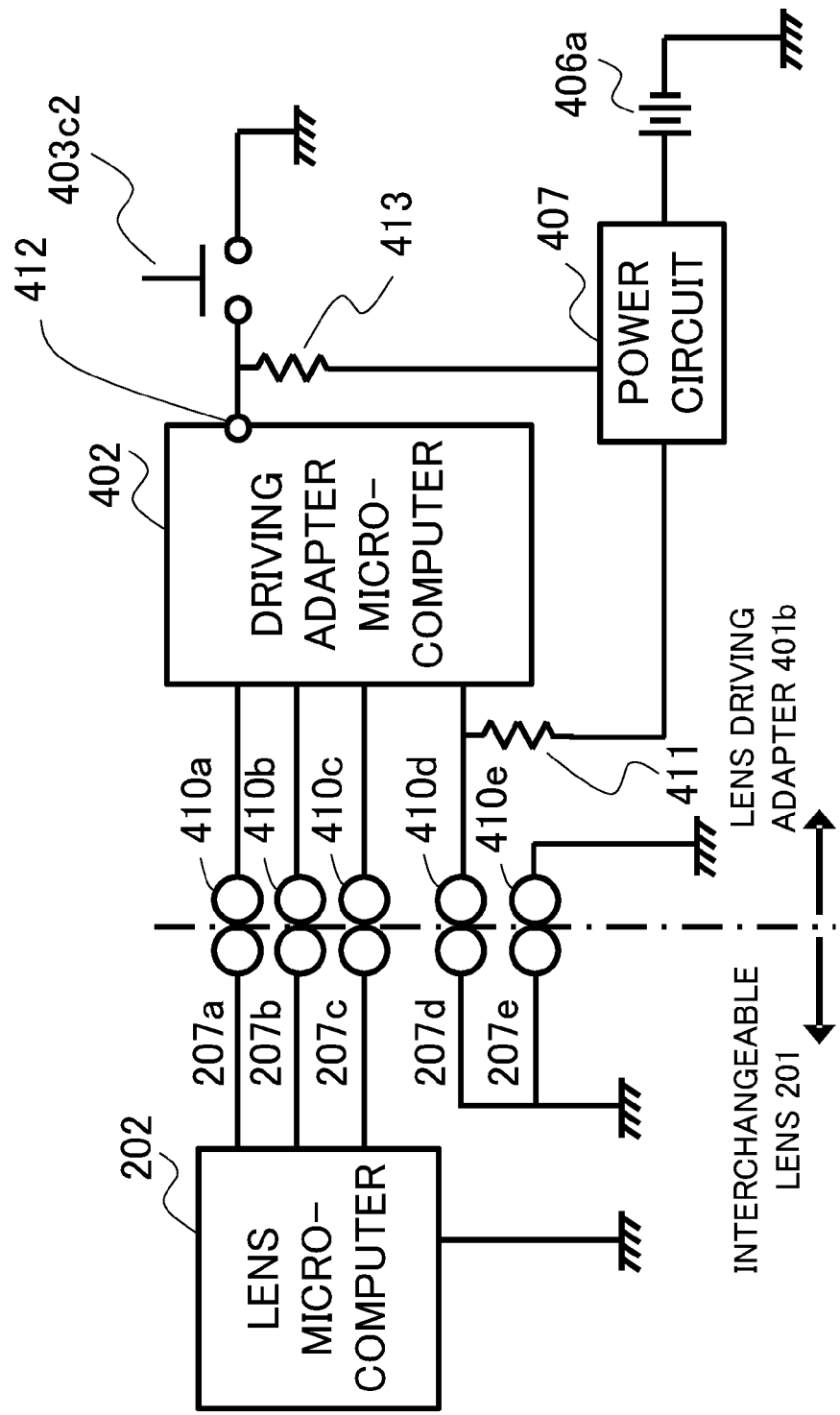
FIG. 6 is a block diagram of illustrating a main part of a lens driving adapter and an interchangeable lens in Embodiment 3.

FIG. 6 is a block diagram of main parts of the lens driving adapter 401b and the interchangeable lens 201 in this embodiment. When the lens driving adapter 401b is not attached to the interchangeable lens 201, the detection switch 403c2 is in the ON state. In this time, an attachment detection terminal 412 (first terminal) is at the LOW level. On the other hand, when the lens driving adapter 401b is attached to the interchangeable lens 201, the detection switch 403c2 is in the OFF state. In this time, the attachment detection terminal 412 is pulled up by a pull-up resistor 413, and accordingly the attachment detection terminal 412 is at the HIGH level. As a result, the driving adapter microcomputer 402 determines that the lens driving adapter 401b is attached to the interchangeable lens 201.

Next, referring to FIG. 7, processing that is performed depending on the attachment state of the lens driving adapter 401b to the interchangeable lens 201 will be described. FIG. 7 is a flowchart of illustrating the processing that is performed depending on the attachment state of the lens driving adapter 401b.

Figure 4:
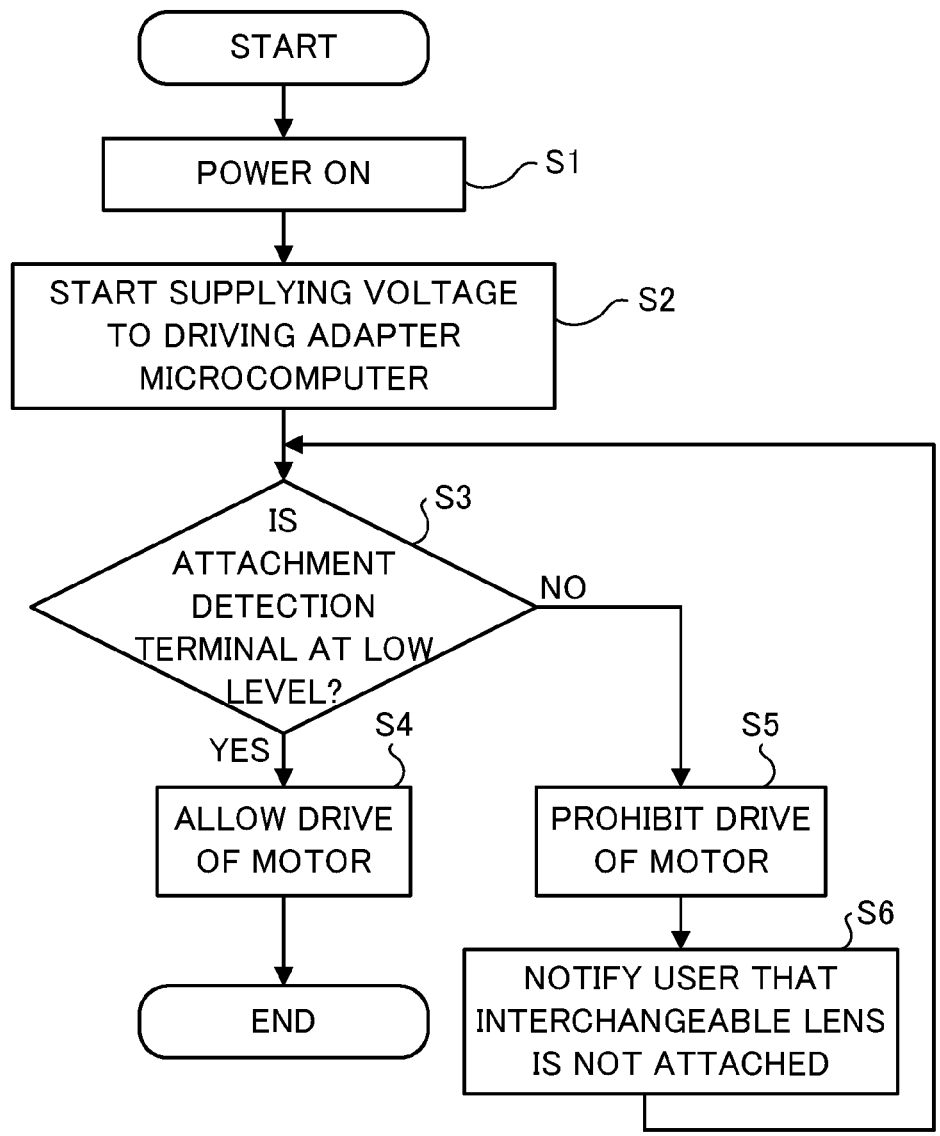
FIG. 4 is a flowchart of processing depending on an attachment state of the lens driving adapter in Embodiment 1.
Figure 7:
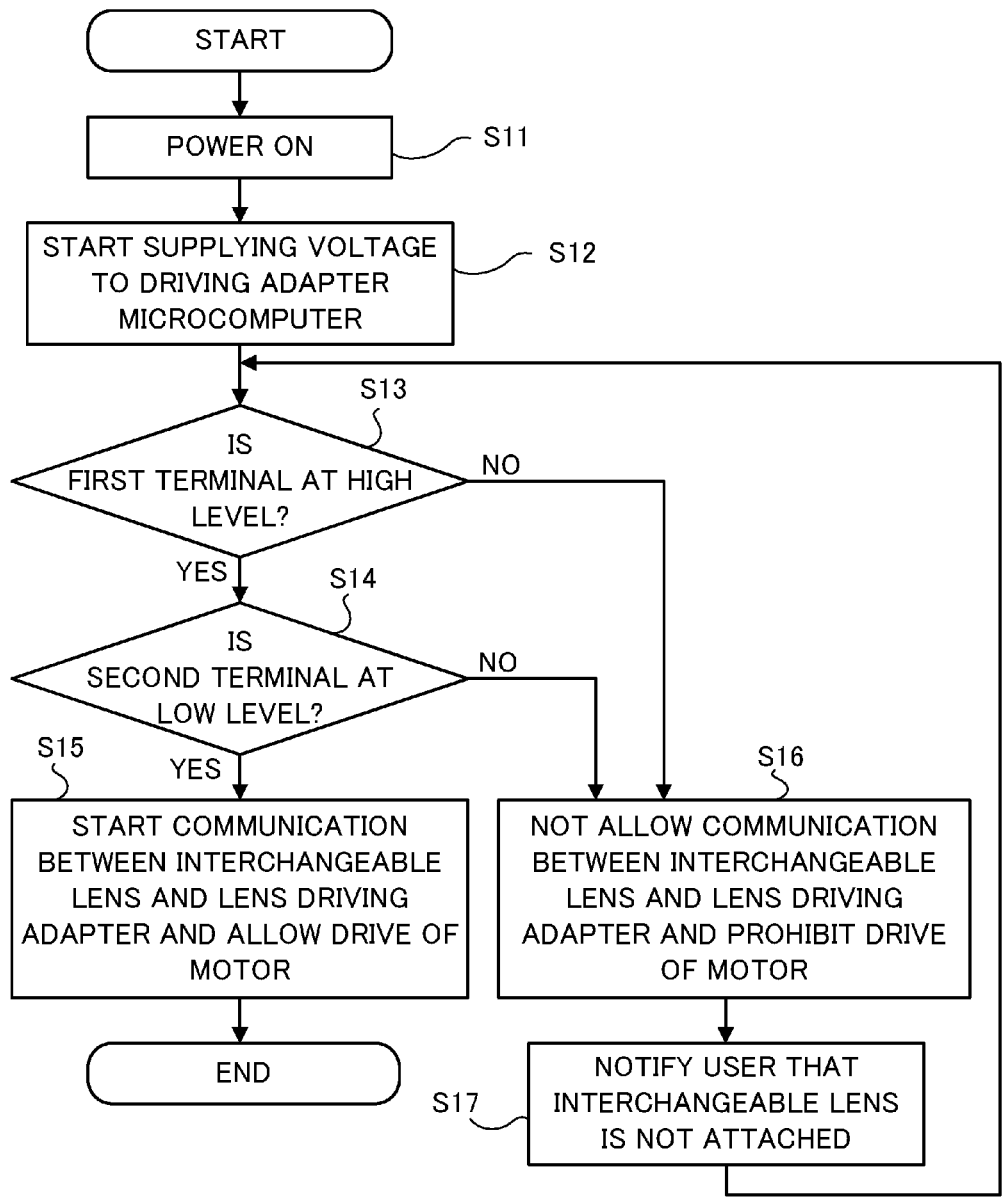
FIG. 7 is a flowchart of processing depending on an attachment state of the lens driving adapter in Embodiment 3.

Steps S11 and S12 of FIG. 7 are the same as steps S1 and S2 of FIG. 4, respectively, described in Embodiment 1. Subsequently, at step S13, the driving adapter microcomputer 402 determines whether or not the attachment detection terminal 412 (first terminal) is at the HIGH level. When the attachment detection terminal 412 is at the HIGH level, the flow proceeds to step S14. At step S14, the driving adapter microcomputer 402 determines whether or not the attachment detection terminal 410d (second terminal) is at the LOW level. When the attachment detection terminal 410d is at the LOW level, the flow proceeds to step S15. At step S15, the driving adapter microcomputer 402 determines whether or not the lens driving adapter 401 is attached to the interchangeable lens 201. Then, the driving adapter microcomputer 402 starts communication between the lens driving adapter 401b and the interchangeable lens 201 and also it allows the drive of the motor 405. As described above, when the user operates the zoom switch 408, the driving adapter microcomputer 402 drives the motor 405 according to an operation amount of the zoom switch 408 to rotate the driving gear 404.

On the other hand, when the attachment detection terminal 412 is not at the HIGH level (i.e., the attachment detection terminal 412 is at the LOW level) at step S13, the flow proceeds to step S16. At step S16, the driving adapter microcomputer 402 determines that the lens driving adapter 401b is not attached to the interchangeable lens 201. Then, the driving adapter microcomputer 402 does not perform the communication between the lens driving adapter 401b and the interchangeable lens 201, and it prohibits (suppresses or limits) the drive of the motor 405. Then, at step S17, the driving adapter microcomputer 402 outputs, to a display unit (not illustrated) of the lens driving adapter 401b, a display to notify the user that the lens driving adapter 401b is not attached to the interchangeable lens 201. Then, the flow returns to step S13. When the attachment detection terminal 410d is not at the LOW level (i.e., the attachment detection terminal 410d is at the HIGH level) at step S14, the flow proceeds to step S16 and the driving adapter microcomputer 402 performs the same processing described above. In this embodiment, the voltage of each of the attachment detection terminals 410d and 412 only needs to change depending on whether or not the lens driving adapter 401b is attached to the interchangeable lens 201, and accordingly the HIGH level and the LOW level may be opposite to each other.

In this embodiment, the controller (driving adapter microcomputer 402) determines, based on a rotation position of the attachment lever 403c and a voltage of the attachment detection terminal 410d, whether or not the lens driving adapter 401b is attached to the interchangeable lens 201. More preferably, when the lens driving adapter 401b is attached to the interchangeable lens 201, the driving adapter microcomputer 402 allows the communication with the interchangeable lens 201 and the drive of the driving gear 404 by the motor 405. On the other hand, when the lens driving adapter 401b is not attached to the interchangeable lens 201, the driving adapter microcomputer 402 prohibits (suppresses or limits) the communication with the interchangeable lens 201 and the drive of the driving gear 404 by the motor 405.

As described above, the driving adapter microcomputer 402 determines whether or not the lens driving adapter 401b is attached to the interchangeable lens 201 based on both of the state of the detection switch 403c2 provided on the attachment portion 403 and the voltage level of the attachment detection terminal 410d. Accordingly, the driving adapter microcomputer 402 determines that the lens driving adapter 401b is in the attachment state only when the driving adapter communication portion 410 is in contact with the lens communication portion 207 and the lens driving adapter 401b is firmly fixed to the interchangeable lens 201 by the rotation of the attachment lever 403c. As a result, for example when the lens driving adapter 401b is not firmly fixed to the interchangeable lens 201 even in the state where the driving adapter communication portion 410 is in contact with the lens communication portion 207, the determination of the attachment state can be avoided. Accordingly, the lens driving adapter with higher safety can be provided.

As described above, in each embodiment, the controller (driving adapter microcomputer 402) allows an operation of the driver (the motor 405 and the driving gear 404) when the lens driving adapter is attached to the lens apparatus (interchangeable lens 201), and it limits the operation of the driver when the lens driving adapter is not attached to (i.e., is removed from) the lens apparatus. Preferably, the controller (driving adapter microcomputer 402) controls the driver based on an instruction via the input portion, and it determines whether or not the lens driving adapter is attached to the lens apparatus. When the lens driving adapter is not attached to the lens apparatus, the controller does not output a control signal to the driver or it outputs a control signal to the driver such that the driver does not operate.

More preferably, the driver includes the gear (driving gear 404) that engages with the operation member (manual operation portion 204) and the motor 405 that drives the gear. When the lens driving adapter is attached to the lens apparatus, the controller allows the motor to drive the gear.

On the other hand, when the lens driving adapter is not attached to the lens apparatus, the controller limits drive of the gear by the motor.

According to each embodiment, high-safety optical driving apparatus, lens apparatus, and image pickup apparatus can be provided.

While the configuration of the lens driving adapter with built-in power source is described as an example in this embodiment, the present invention is not limited thereto. The present invention can be applied also to for example a lens driving adapter without built-in power source to which power is supplied from a camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-239406, filed on Dec. 8, 2015, which is hereby incorporated by reference herein in its entirety.

What is claimed is:

1. An optical driving apparatus removably attachable to a lens apparatus, the optical driving apparatus comprising:
   an attachment portion attachable to the lens apparatus;
   a driver configured to electrically drive an operation member, the operation member being configured to manually move an optical system of the lens apparatus in an optical axis direction, the driver including a gear configured to engage with the operation member, wherein at least a part of the gear is exposed at an opening formed in the optical driving apparatus;
   a storage portion configured to store a battery portion to supply power to the driver; and
   a controller configured to control the driver based on an instruction via an input portion,
   wherein the controller is configured to:
      allow an operation of the driver when the optical driving apparatus is attached to the lens apparatus; and
      limit the operation of the driver when the optical driving apparatus is not attached to the lens apparatus.

2. The optical driving apparatus according to claim 1, wherein the controller is configured to:
   determine whether or not the optical driving apparatus is attached to the lens apparatus; and
   not to output a control signal to the driver when the optical driving apparatus is not attached to the lens apparatus.

3. The optical driving apparatus according to claim 1, wherein the controller is configured to:
   determine whether or not the optical driving apparatus is attached to the lens apparatus; and
   output a control signal to the driver such that the driver does not operate when the optical driving apparatus is not attached to the lens apparatus.

4. The optical driving apparatus according to claim 1, wherein the driver includes
   a motor configured to drive the gear, and
   wherein the controller is configured to:
      allow the motor to drive the gear when the optical driving apparatus is attached to the lens apparatus; and
      limit driving of the gear by the motor when the optical driving apparatus is not attached to the lens apparatus.

5. The optical driving apparatus according to claim 1, further comprising a communication portion including a communication terminal communicating with the lens apparatus and an attachment detection terminal,
   wherein the controller is configured to determine, based on a voltage of the attachment detection terminal, whether or not the optical driving apparatus is attached to the lens apparatus.

6. The optical driving apparatus according to claim 1, wherein the attachment portion includes:
   an engagement portion engageable with the lens apparatus; and
   an operation portion capable of moving the engagement portion to engage with the lens apparatus, and
   wherein the controller is configured to determine, based on a position of the operation portion, whether or not the optical driving apparatus is attached to the lens apparatus.

7. The optical driving apparatus according to claim 6, wherein the operation portion is a rotating operation portion rotatable to move the engagement portion to engage with the lens apparatus, and
   wherein the controller is configured to determine, based on a rotation position of the rotating operation portion, whether or not the optical driving apparatus is attached to the lens apparatus.

8. The optical driving apparatus according to claim 7, wherein the attachment portion includes:
   a protrusion provided on the rotating operation portion; and
   a switch configured to be pressed by the protrusion depending on the rotation position of the rotating operation portion, and
   wherein when the switch is pressed by the protrusion, the controller is configured to determine that the optical driving apparatus is attached to the lens apparatus.

9. The optical driving apparatus according to claim 1, further comprising a communication portion including a communication terminal communicating with the lens apparatus and an attachment detection terminal,
   wherein the attachment portion includes:
      an engagement portion engageable with the lens apparatus; and
      a rotating operation portion rotatable to move the engagement portion to engage with the lens apparatus, and
   wherein the controller is configured to determine, based on a rotation position of the
      rotating operation portion and a voltage of the attachment detection terminal, whether or not the optical driving apparatus is attached to the lens apparatus.

10. The optical driving apparatus according to claim 9, wherein the driver includes:
    a gear configured to engage with the operation member; and
    a motor configured to drive the gear,
    wherein the controller is configured to:
       allow the communication portion to communicate with the lens apparatus and the motor to drive the gear when the optical driving apparatus is attached to the lens apparatus; and
       limit communication with the lens apparatus and drive of the gear by the motor when the optical driving apparatus is not attached to the lens apparatus.

11. A lens apparatus comprising:
    an optical system; and an optical driving apparatus removably attachable to the lens apparatus, the optical driving apparatus comprising:
    an attachment portion attachable to the lens apparatus;
    a driver configured to electrically drive an operation member, the operation member being configured to manually move an optical system of the lens apparatus in an optical axis direction, the driver including a gear configured to engage with the operation member, wherein at least a part of the gear is exposed at an opening formed in the optical driving apparatus;
    a storage portion configured to store a battery portion to supply power to the driver; and
    a controller configured to control the driver based on an instruction via an input portion,
    wherein the controller is configured to:
        allow an operation of the driver when the optical driving apparatus is attached to the lens apparatus and
        limit the operation of the driver when the optical driving apparatus is not attached to the lens apparatus.

12. An image pickup apparatus comprising:
a lens apparatus including an optical system;
an image sensor configured to photoelectrically convert an optical image formed via the optical system; and
an optical driving apparatus removably attachable to the lens apparatus, the optical driving apparatus comprising:
    an attachment portion attachable to the lens apparatus;
a driver configured to electrically drive an operation member, the operation member being configured to manually move an optical system of the lens apparatus in an optical axis direction, the driver including a gear configured to engage with the operation member, wherein at least a part of the gear is exposed at an opening formed in the optical driving apparatus;
    a storage portion configured to store a battery portion to supply power to the driver; and
    a controller configured to control the driver based on an instruction via an input portion,
    wherein the controller is configured to:
        allow an operation of the driver when the optical driving apparatus is attached to the lens apparatus and
        limit the operation of the driver when the optical driving apparatus is not attached to the lens apparatus.

* * * * *